(12) United States Patent
Baudry et al.

(10) Patent No.: US 8,209,539 B2
(45) Date of Patent: Jun. 26, 2012

(54) METHOD FOR TIME-STAMPED WATERMARKING, METHOD AND DEVICE FOR TIME STAMP DECODING USE

(75) Inventors: Séverine Baudry, Rennes (FR); Philippe Nguyen, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 460 days.

(21) Appl. No.: 11/989,150

(22) PCT Filed: Jul. 21, 2006

(86) PCT No.: PCT/EP2006/064495
§ 371 (c)(1),
(2), (4) Date: Apr. 8, 2009

(87) PCT Pub. No.: WO2007/010030
PCT Pub. Date: Jan. 25, 2007

(65) Prior Publication Data
US 2009/0217052 A1    Aug. 27, 2009

(51) Int. Cl.
*H04L 9/32* (2006.01)
(52) U.S. Cl. ........................................................ 713/178
(58) Field of Classification Search ...................... None
See application file for complete search history.

(56) References Cited

U.S. PATENT DOCUMENTS
2001/0047478 A1   11/2001  Mase
2004/0128512 A1*  7/2004   Sharma et al. .............. 713/176

FOREIGN PATENT DOCUMENTS
CN          1118142         8/2003
(Continued)

OTHER PUBLICATIONS
N. Kashyap et al: "Codes for data synchronization with timing" Data Compressiion Conference, 1999, Proceedings. DCC '99 Snowbird, UT, USA Mar. 19-31, 1999, pp. 443-452.
(Continued)

*Primary Examiner* — Brandon Hoffman
(74) *Attorney, Agent, or Firm* — Myers Wolin, LLC (57) ABSTRACT

The invention relates to a method for watermarking at least one timestamp in a set of support data, comprising the following steps for each timestamp: association with the timestamp of the value at a given time of a reference timestamp signal, that is a determinist signal varying over time in a given temporal reference and being written as s(t), wherein t is incremented according to an incrementing step equal to one predetermined time unit; and watermarking of the value in the set of support data. The invention also relates to a corresponding decoding method comprising the following steps: reading, in the set of support data, of at least one value of a phase-shifted timestamp signal, of the same form as the reference timestamp signal but having in relation to this signal an unknown phase shift $\phi$ in a given temporal reference, the previous watermarking of each timestamp consisting in a watermarking of the value at a given watermarking time of the reference timestamp signal; estimation of the phase shift $\phi$ from the at least one read value of the phase-shifted timestamp signal and from the knowledge of the reference timestamp signal; and for the at least one read value, read at a given time $t_r$, determination of an associated timestamp h associated according to the read time $t_r$ and the estimated phase shift $\phi$.

13 Claims, 4 Drawing Sheets

FOREIGN PATENT DOCUMENTS

EP  1001368  5/2000

OTHER PUBLICATIONS

N. Kashyap et al: "Codes for data synchronization and timing" Information Theory and Communications Workshop, 1999, Proceedings of the 1999 IEEE Kruger National Park, South Africa Jun. 20-25, 1999, Piscataway, NJ USA, IEEE, pp. 63-65.

H. Morita et al: "On the Construction of Maximal Prefix-Synchronized Codes" IEEE Transactions on Information Theory, IEEE Service Center, Piscataway, NJ US, vol. 42, No. 6, Nov. 1996, pp. 2158-2166.

D. Irovski et al: "Digital rights management for digital cinema" Proc. of the SPIE, Bellingham, VA. US, vol. 4472, Jul. 31, 2001, pp. 105-120.

N. Kashyap et al: "Data synchronization with timing" IEEE Transactions on Information Theory, vol. 47, No. 4, May 2001, pp. 1444-1460.

Search Report Dated Sep. 6, 2006.

* cited by examiner

METHOD FOR TIME-STAMPED WATERMARKING, METHOD AND DEVICE FOR TIME STAMP DECODING USE

1. SCOPE OF THE INVENTION

1.1 Context of the Invention

The invention falls within the digital watermarking domain, which is a marking technique consisting in inserting one or more watermarking messages into a set of support data, so as to combat fraud and pirating and protect intellectual property rights.

More precisely, the invention relates to a watermarking method of at least one timestamp in a set of support data, as well as a decoding method of at least one watermarked timestamp in a set of support data.

The invention can be applied to any type of support data (video, image, audio, text, 3D data, etc.).

Moreover, the invention is applicable irrespective of the format of the support data: in the form of a stream (for example a video signal captured on a television channel), in the form of a file, in the form of a recording (cassette, DVD, etc.), etc.

With a sole purpose of simplification and for a correct understanding by the reader, a more detailed description is given hereafter of the context of the invention by taking the case of a data sequence of the video type as an example. It is noted that the invention can nevertheless be applied to any type of data set.

1.2 Definitions

The term "timestamp" is used to denote an item of time information (for example, the date and time) that defines a time (or temporal position) in relation to an origin in a given temporal reference and that is associated with a part of a signal (for example a unit of data, such as an image, a set of data). For example, in the case where the signal is a video sequence (a film), a timestamp can be associated with each image and corresponds to the position of this image in the sequence.

It must be noted that the marker used to define the time is not necessarily the universal temporal reference expressed in years, months, . . . , minutes, seconds, with respect to the origin of the usual time in the Gregorian calendar. The origin of the time (time t=0) can for example be chosen as the time corresponding to the first image of a sequence (for a video), or else a given date ($1^{st}$ Jan. 2000, for example).

Likewise, the measurement unit of the time is not necessarily one of the usual units (day, second, etc.): for video, it can be more relevant to define the basic unit as being the duration of an image ($\frac{1}{25}^{th}$ of a second for the European TV standard). It should be noted that it is very easy to pass from one temporal reference to another through a simple conversion.

Moreover, the following timestamp parameters are defined:

- timestamp accuracy (to the image, to the second, to the minute, etc.,
- amplitude of the timestamp (period): length of the sequence (the timestamp is therefore known modulo the length of the sequence),
- minimum granularity for the detection (or decoding latency): minimum size (number of images) necessary for the detection to correctly determine the timestamp,
- robustness to errors: depends on the distance between two portions of video representing two different times,
- bitrate, namely the size of the information required to code the timestamp per image.

1.3 Reminder of the General Principles of Watermarking Systems

Within the framework of the present invention, one is placed in the case where watermarking message comprises at least one timestamp.

Generally, a watermarking system is an information transmission system that comprises at least one originator (the "watermarker" itself), that modifies a support video to insert the watermarking message, and at least one receiver ("watermarking reader"), that determines, upon the reception of any video, whether said video is watermarked and, if yes, what is the inserted message.

The originator (watermarker) takes as input a set of "support" data (typically video data) and a certain number of parameters. The number of parameters notably generally figures the watermarking message (also called "carrier watermark"), that is represented by a series of M binary elements (M≧1). Generally, one also finds other parameters, such as the key that provides a certain level of security, the marking force, etc. According to these parameters and to the video itself, the watermarker modifies the video to produce a watermarked video.

The receiver (watermarking reader) takes a video as input, together with possibly a certain number of parameters (for example a key). Possibly, it can also take as input the original video, that can be used to facilitate the determination of the channel parameters, by comparison between the original video and the tested video (video on which reading the watermarking is attempted). The original video can also be used to facilitate the reading of the watermarking message: for example subtracting the original of the tested video enables the impact of the noise affecting the watermarking to be reduced, particularly the noise produced by the original video itself. From this data, it generally performs a detection step that determines whether or not the video is watermarked. If the detection is positive, it performs a determination (or decoding) step of the watermark message or messages (it is possible to have several watermark messages if the support data is derived from a compositing operation, for example editing of several video sequences, image averaging, producing an edit or mosaic using several support data, etc.). The watermark messages detected are possibly accompanied by auxiliary information: for example a reliability index (estimation of the probability that the estimated watermark message has errors), location information of the watermark (temporal and/or spatial location, in the compositing case).

It should be noted that all the steps comprising the reading process can be carried out directly on the video data itself, namely on a transform representation of the data (Fourier transform, discrete cosine transform—DCT—, wavelet transform, etc.).

The watermark location is useful, even essential. Indeed, watermarking is generally only of interest when associated with support data, for example to enable a broadcasted extract to be identified. When several watermarking messages are found on a same set of support data, it is therefore important to know as precisely as possible to which support data subset each watermark message corresponds.

2. PRIOR ART

When it is required to transmit by watermarking the date and time corresponding to the video portion (portion containing an image or a predetermined number of images), the known method consists in watermarking, on this portion of the video, a timestamp containing the corresponding date and time. The frequency of change of date and the accuracy can vary according to the applications: for example, if it is required to identify the time with accuracy (for example, if the watermarking is used to synchronize the video and audio), an update is then performed on the date contained in the timestamps to watermark all the images, and the accuracy of the date should be in the order of 40 ms (duration of a video image in European TV format). If each timestamp is only used to identify a video portion (for example, to automatically identify a broadcast programme), then it is sufficient to have a lower accuracy by only changing the date contained in the timestamps to watermark every second.

A disadvantage of the known technique is that the size of the watermarked message depends on the maximum value allowed for the timestamp, and the accuracy required. If for example, it is required to be able to identify a portion of video in a film (for example on a DVD), with an accuracy to the second, the watermarked timestamp, with the known technique, will be an identifier in the form h:mm:ss (hours, minutes, seconds). However, if it is required to identify, always with an accuracy of one second, a television programme over the period of a year, each watermarked timestamp must then be an identifier of the form mm::dd::hh::mm::ss (month, days, hours, minutes, seconds). However, this can be problematic if the watermarked video experiences deterioration during its lifetime, particularly during its transmission. Indeed, modifications of the video (for example, loss compression of the MPEG2 type) constitute a noise for the watermarking. The greater the noise, the more redundancy must be introduced (for example in the form of error correcting codes) to ensure a correct transmission of the watermarking, and thus the lower the maximum possible size of the watermarking message will be. Hence, timestamps can only be transmitted with a high accuracy and/or a high maximum value if the noise introduced by the transmission is sufficiently low. To use these techniques without the risk of decoding an erroneous timestamp, it is therefore essential to know in advance the order of magnitude of the noise power on the transmission channel. The dimensioning of the system is thus fixed once and for all.

Another disadvantage of the known technique is that is does not always detect and correct the inconsistent timestamps within a sequence of timestamps. Indeed, with the aforementioned known technique, the watermarking of each timestamp consists in directly watermarking the value $d_k$ of this timestamp in each of the images. As explained above, this value is for example an identifier of the form mm::dd::hh::mm::ss defining a time to an accuracy of one second. It is possible, to be more robust to errors, to encode this value $d_k$ using an error correcting code and watermark the encoded value $C(d_k)$ instead. During the decoding, a series of noisy value $C'_k$ $C'_{k+1}$ ... $C'_{k+n}$ is recovered. Each of these noisy values must then be decoded successively: if the correcting code is enough to correct all the errors, a consistent series of values is then found: $d_k$, $d_{k+1}$, ... $d_{k+n}$. An attempt can subsequently be made to check that the decoding operations are correct, by verifying that the decoded values are timestamps that are in the right sequence. However, if the channel is too noisy, it may be that one or more of the decoded values are erroneous: if the number of errors is low, they can be detected by identifying the timestamps inconsistent with the rest of the series (value "jumps"), then correcting them. However, if a large number of decoded values are erroneous, it is no longer possible to detect them and therefore to correct them.

Moreover, it is rare to attempt to find a timestamp on a single video image. Generally, a video sequence of varying length is available, for which it is required to know the successive timestamps (one timestamp per image for example). It is also frequently interesting to know the video portion (also called watermarked segment) on which these timestamps are actually present. In other words, when an attempt is made to decode the timestamps throughout a video sequence, in most applications, it is necessary to determine two additional unknowns, namely the start and end of the watermarked segment with the timestamps of the same kind (namely defined in a same temporal reference). Moreover, if the video is constituted by an editing of several non-watermarked segments, or watermarked with timestamps of possible different kinds (namely defined in different temporal references), it is sometimes interesting to precisely identify the transitions between these different segments. Typically, in the applications where a succession of relatively short segments are involved, fed back in alternation with non-watermarked segments (case of news statistics), it is necessary to be able to identify the start and end of the watermarked segments fairly precisely.

Unfortunately, owing to the degradations induced by the transmission of the video over a noisy channel, the watermarked timestamp can no longer be read on some images or some parts of the sequence. With the method of the aforementioned prior art, where the watermarked timestamp is read on each of the images of the sequence, it is possible to decode erroneous timestamps locally, or not to succeed in decoding the watermarked timestamp. In this case, it thus becomes difficult to identify in a correct and precise manner the transitions between segments (watermarked and non-watermarked) of the sequence. Unfiltered decoding errors can therefore be interpreted as the presence of "micro-segments" of very short length (a few images at the most), which is very unlikely.

3. PURPOSES OF THE INVENTION

The purpose of the invention is notably to overcome these different disadvantages of the technique known to the prior art.

More precisely, one of the purposes of the present invention, in at least one embodiment, is to provide a timestamp(s) watermarking/decoding technique in a data set (for example a video sequence), enabling the transmission of timestamps in much more flexible and efficient manner, as well as an easier and more enhanced timestamp decoding than with the known technique described above.

The purpose of the invention is also, in at least one embodiment, to supply such as technique with which the bitrate necessary to the coding of the timestamp is no longer dictated by the amplitude of the timestamp and by its accuracy; this bitrate can be reduced if a greater detection latency is accepted. This involves for example, for a same steganographic bandwidth reserved for the timestamp, increasing the precision and amplitude of the timestamp.

Another purpose of the invention, in at least one embodiment, is to supply such a technique thanks to which it is no longer necessary to know with precision the characteristics (error rate) of the steganographic transmission channel to dimension the precision and amplitude of the timestamp.

To achieve this, one purpose of the invention, in at least one embodiment, is to propose a coding having a scalable character enabling for detection to adapt to the error rate of the channel, by introducing a varying degree of detection granularity.

An additional purpose of the invention, in at least one embodiment, is to supply such a technique.

Yet another purpose of the invention, in at least one embodiment, is to supply such a technique enabling, in addition to the timestamps, to know precisely the boundaries of the segments watermarked with the timestamps of the same kind (defined in a same temporal reference), and to reduce the risks of decoding errors induced by the channel noise.

Yet another purpose of the invention, in at least one embodiment, is to supply such a technique enabling the specific features of the noise introduced by coding operations using motion compensation (of the MPEG type) to be taken into account, in order to increase the reliability of the decoding.

4. SUMMARY OF THE INVENTION

These different purposes, as well as others that will subsequently appear, are reached according to the invention using a watermarking method of at least one timestamp in a set of support data, said method comprising the following steps, for each timestamp:

association with said timestamp of the value at a given time of a reference timestamp signal, that is a determinist signal varying over time in a given temporal reference and being written as s(t), wherein t is incremented according to an incrementing step equal to one predetermined time unit, watermarking of said value in the set of support data.

The general principal of the invention therefore consists in watermarking a timestamp, not in the form of an identifier (for example in the form mm::dd::hh::mm::ss, for month, days, hours, minutes and seconds), but in the form of the value at a given time of a reference timestamp signal (namely a clock signal).

As explained in detail further on, this allows many more decoding possibilities to be offered than the technique of the prior art, owing to the fact that it is possible to parameterise the decoding technique more finely than with an identifier.

Preferentially, the reference timestamp signal has distinct values when t varies from $t_d$ to $t_f$, where $t_d$ and $t_f$ are the start and end times of the timestamp watermarking. Upon decoding, this enables each timestamp to be identified uniquely.

In a first particular embodiment of the invention, the set of support data is a sequence of successive data units, and in that each value of the reference timestamp signal is watermarked in a separate data unit. Hence, the detection latency is reduced.

In a second particular embodiment of the invention, all the support data is a sequence of successive data units, and in that each value of the reference timestamp signal is watermarked by being spread over at least two successive data units.

In relation to the aforementioned first embodiment, the detection latency is increased, but it is possible, for a same steganographic bandwidth reserved for the timestamp, to increase the precision and amplitude of the timestamp.

In an advantageous manner, the sequence of successive data units belongs to the group comprising: sequences of units of video type data, also called video sequences and sequences of units of audio type data, also called audio sequences.

According to an advantageous characteristic, a sequence of values of the reference timestamp signal $x_1, \ldots, x_k, x_{k+1}, \ldots$ is watermarked such that there is:

a predetermined function f enabling a $k+1^{th}$ value to be calculated according to the $k^{th}$ value: $\forall k\ x_{k+1}=f(x_k)$, and/or a predetermined function $f_{-1}$ enabling a $k^{th}$ value to be calculated according to the $k+1^{th}$ value: $\forall k\ x_k = f^{-1}(x_{k+1})$.

As explained in detail further on, this characteristic enables upon reception (timestamp decoding), to bring several values successively received to several estimations of a same received value, and to perform an overall processing operation on these estimations of a same value received (possibly after having merged them).

Hence, the timestamp watermarking can be seen according to the invention as a scalable coding over time. Indeed, if the signal is very noisy, it is possible on reception to globally process several consecutive data units (images for example) before moving on to the decoding operation. There is therefore an equivalent correcting code of a higher redundancy, therefore more resistant to the noise, however the detection latency will be higher. The resolution (minimum size of watermarked sequence necessary to decode a segment) thus varies automatically according to the signal to noise ratio, without needing to modify the coding.

In an advantageous embodiment of the invention, the values $x_1, \ldots, x_k, x_{k+1}, \ldots$ are separate words of an m-sequence code, and in that the functions f and $f_{-1}$ are cyclic permutations.

Advantageously, each of the values of the reference timestamp signal comprises N parts, where $N \geq 2$, a part of row 1, called rapid part, being incremented every timestamp and taking cyclic values according to a period $p_1$, a part of row i, where $i \in \{2 \ldots N\}$, being incremented when the part of row i−1 has carried out a full period $p_{i-1}$, and taking cyclic values according to a period $p_i$. Moreover, the association and watermarking steps are performed separately, and whether identically or not, for each of the N parts of the values.

As explained in detail further on, the slow/other part(s) separation has the advantage of reducing the decoding complexity.

Advantageously, the sequence $x_1, \ldots, x_k, x_{k+1}, \ldots$ is a sequence of rapid parts of values of the timestamp signal.

The invention also relates to a decoding method of at least one watermarked timestamp in a set of support data, said decoding method comprising the following steps:

reading, in the set of support data, of at least one value of a phase-shifted timestamp signal, of the same form as a reference timestamp signal but having in relation to this signal an unknown phase shift φ in a given temporal reference, the previous watermarking of each timestamp consisting in a watermarking of the value at a given watermarking time of the reference timestamp signal, that is a determinist signal varying over time in a given temporal reference and being written as s(t), wherein t is incremented according to an incrementing step equal to one predetermined time unit, estimation of the phase shift φ from said at least one read value of the phase-shifted timestamp signal and from the knowledge of the reference timestamp signal, for said at least one read value, read at a given time $t_r$, determination of an associated timestamp h according to said read time $t_r$ and to the estimated phase shift φ. The general principle of the timestamp decoding according to the invention thus consists in estimating a phase shift, from one or more received values, and in deducing the timestamps of this phase shift and read times of the received values.

This naturally supposes that the timestamps are transmitted according to the timestamp watermarking method of the invention (namely in the form of a value at a given time of a reference timestamp signal) and not in the form of an identifier according to the prior art (for example of the form mm::dd::hh::mm::ss).

Advantageously, the determination of the associated timestamp h consists in adding said read time $t_r$ and the estimated phase shift $\phi$: $h=t_r+\phi$.

Advantageously, the determination of the associated timestamp h takes into account a change of sampling frequency between the reference timestamp signal and the phase-shifted timestamp signal, in such a manner that said associated timestamp h is such that: $h=\omega \cdot t_r+\phi$, where $\omega$ is equal to the ratio between the sampling frequency of the reference timestamp signal and the sampling frequency of the phase-shifted timestamp signal.

Preferentially, the phase-shifted timestamp signal has distinct values when t varies from $t_d'$ to $t_f'$, where $t_d'$ and $t_f'$ are the start and end times of the timestamp decoding.

Advantageously, the set of support data is a sequence of successive data units, and in that, during the reading step, each value, coded or not coded, is read in a separate data unit.

According to an advantageous variant, the set of support data is a sequence of successive data units, and, during the reading step, each value, coded or not coded, is obtained by combining information read in at least two data units.

Advantageously, the sequence of successive data units belongs to the group comprising:
  sequences of units of video type data, also called video sequences,
  sequences of units of audio type data, also called audio sequences.

Advantageously, the reading step comprises the following steps: reception of the raw data of at least one received value; and decoding of said at least one received value, enabling a read value of the out-of-phase signal equal to one of the values of the reference signal to be obtained.

In a first advantageous embodiment of the invention, the reception of the raw data step enables a sequence, called received sequence, of at least two received values to be received, and the decoding step consists in a decoding by a sliding correlation decoding between said received sequence and a reference sequence.

In a second advantageous embodiment of the invention, the reception of the raw data step enables a sequence, called received sequence, of at least two received values to be received; the reception of the raw data step is followed by an overall processing step of said received sequence, enabling a resultant value to be obtained; and the decoding step concerns the said resultant value.

In a first case of the aforementioned second embodiment, the sequence received comprises T received values $y_1, \ldots, y_k, y_{k+1}, \ldots y_T$, corresponding to T initial noisy values $x_1, \ldots, x_k, x_{k+1}, \ldots x_T$, the initial values $x_1, \ldots, x_k, x_{k+1}, x_T$ being such that there is:
  a predetermined function f enabling a $k+1^{th}$ initial value to be calculated according to the $k^{th}$ initial value: $\forall k \; x_{k+1}=f(x_k)$, and/or
  a predetermined function $f_{-1}$ enabling a $k^{th}$ initial value to be calculated according to the function of the $k+1^{th}$ initial value: $\forall k \; x_k=f^{-1}(x_{k+1})$,
the overall processing phase comprises a step for obtaining T' estimations of an initial value $x_j$, where $T' \leq T$ and $j \in \{1 \ldots T\}$, by applying said function f or said function $f^{-1}$ a predetermined number of times to each one of T' received values, and the decoding step consists in performing a decoding based on the T' estimations of the initial value $x_j$.

Advantageously, the initial values $x_1, \ldots, x_k, x_{k+1}, \ldots x_T$ are separate words of an m-sequence code, and in that the functions f and $f_{-1}$ are cyclic permutations.

Advantageously, the decoding based on the T' estimations of the initial value $x_j$ is a majority decoding.

According to one advantageous variant, the overall processing step also comprises a fusion step of the T' estimations of the initial value $x_j$, enabling a merged value to be obtained. Moreover, the decoding step consists in performing a decoding of the merged value.

In a second case of the aforementioned second embodiment, the overall processing step comprises a fusion step of T' received values, where $T' \leq T$, enabling a merged value to be obtained, and a decoding step consists in performing a decoding of the merged value.

Advantageously, the merged value is decoded with an exhaustive decoding.

In an advantageous manner, the fusion step consists in performing an average.

According to an advantageous characteristic, the reception of the raw data step enables a sequence, called received sequence, of at least two received values to be received. Each of the received values comprises N parts, where $N \geq 2$, a part of row 1, called rapid part, being incremented every timestamp and taking cyclic values according to a period $p_1$, a part of row i, where $i \in \{2 \ldots N\}$, being incremented when the part of row i−1 has carried out a full period $p_{i-1}$, and taking cyclic values according to a period $p_i$. The overall processing and coding steps are performed separately, and whether identically or not, for each of the N parts of the received values.

In an advantageous manner, the decoding method further comprises a step for determining the start and end boundaries of at least one watermarked segment within said set of support data, each watermarked segment comprising a plurality of values of the phase-shifted timestamp signal that all correspond to a same phase shift, each of the start and end boundaries being determined by detection of a discontinuity of the phase shift estimated from the values of the phase-shifted timestamp signal, or by an absence of detection of the watermarking on a sufficiently long segment.

Advantageously, the determining step of the boundaries of at least one watermarked segment comprises a morphological filtering step of each watermarked segment by at least one operation belonging to the group comprising the following operations:
  non-selection of any watermarked segment whose size is less than a minimum predetermined size,
  concatenation of two watermarked segments and a gap that separates them, if said watermarked segments comprise values of the phase-shifted timestamp signal corresponding to a same phase shift and if said gap corresponds to an interval of time of a duration less than a minimum predetermined time.

In an advantageous manner, the boundary determining step of a watermarked segment is carried out jointly with the reading step of the values of the phase-shifted timestamp signal contained in said given watermarked segment.

According to an advantageous variant, the boundary determining step of a given watermarked segment, on the one hand, and the reading step of the values of the phase-shifted timestamp signal contained in said given watermarked segment, moreover, are carried out according to a forward-backward process, at one or more iterations, enabling the boundaries then the values to be estimated, or conversely.

Advantageously, the forward-backward process comprises:
  an initialization phase, comprising the following steps:
    for each of the segments of a size greater than a predetermined minimum size, contained in the set of support data, an overall processing operation is attempted and a decoding with an overall processing step comprising a fusion step of the T' estimations of the initial value $x_j$, enabling a merged value to be obtained, the segment with the best decoding score is selected, then a continuation phase, consisting in testing whether or not there are, on a part of the set of support data connected with said selected segment, one or more values of the phase-shifted timestamp signal that correspond to the same phase shift as the values of the phase-shifted timestamp signal contained in said selected segment, in such a manner to determine new boundaries of said selected segment.

Advantageously, the set of support data is a sequence of successive data units. The initialization phase comprises the following preliminary steps: measurement of quality, intrinsic and/or extrinsic, of each of the data units; and selection of some of the data units according to the results of the quality measurement step. Each of the segments for which an overall processing and decoding is attempted comprises only selected data units.

Advantageously, the forward-backward process comprises: a determining phase of the boundaries of a watermarked segment, by using a data consistency statistical measurement, said measurement being intrinsic and/or extrinsic; then a decoding phase of the values of the out-of-phase signal contained in the watermarked segment.

Advantageously, the step for determining the start and end boundaries of at least one watermarked segment comprises a recognition step of a phase shift jitter, comprising the following steps, executed after each estimation of a new phase shift $\phi$:

calculation of distance between the new estimated phase shift $\phi$ and an average phase shift, if said distance is greater than or equal to a predetermined threshold, a phase shift discontinuity decision is taken, which indicates that a boundary of a watermarked segment has been reached, if said distance is less than or equal to a predetermined threshold, a phase shift consistency decision is taken, which indicates that no boundary of a watermarked segment has been reached, update of said mean phase shift taking account of the new estimated phase shift $\phi$.

The invention further relates to a use of timestamps, watermarked with the watermarking method according to the invention and decoded with the decoding method according to the invention in an application belonging to the group comprising:

use of timestamps to identify a video extract precisely, using a programme guide and/or database, use of timestamps for the purposes of network quality control, by identifying a propagation delay, use of timestamps to control the broadcast times and periods of a sequence of data units, use of timestamps to identify a reassembly of a same sequence of data units, use of timestamps to supply a clock related to a sequence of data units.

The invention also relates to a computer program product downloadable from a communication network and/or recorded on a support that can be read by computer and/or run by a processor, said computer program product comprising program code instructions for executing the steps of the method according to the watermarking invention of at least one timestamp, when said program is executed on a computer.

The invention also relates to a computer program product downloadable from a communication network and/or recorded on a support that can be read by computer and/or run by a processor, said computer program product comprising program code instructions for executing the steps of the method according to the decoding invention of at least one watermarked timestamp, when said program is executed on a computer.

The invention also relates to a device for watermarking at least one timestamp in a set of support data, including:

association means, enabling each timestamp to be associated with the value at a given time of a reference timestamp signal, that is a determinist signal varying over time in a given temporal reference and being written as $s(t)$, wherein t is incremented according to an incrementing step equal to one predetermined unit of time, watermarking means of said value in the set of support data.

The invention also relates to a decoding device of at least one watermarked timestamp in a set of support data, said device comprising:

reading means, being able to be used to read, in the set of support data, at least one value of a phase-shifted timestamp signal, of the same form as a reference timestamp signal but having in relation to this signal an unknown phase shift $\phi$ in a given temporal reference, the previous watermarking of each timestamp consisting in a watermarking of the value at a given watermarking time of the reference timestamp signal, that is a determinist signal varying over time in a given temporal reference and being written as $s(t)$, wherein t is incremented according to an incrementing step equal to one predetermined time unit, estimation means of the phase shift $\phi$ from said at least one value of the phase-shifted timestamp signal and from the knowledge of the reference timestamp signal, determination means, for said at least one read value, read at a given time $t_r$, of a timestamp h associated according to said read time $t_r$ and the estimated phase shift $\phi$.

5. LIST OF FIGURES

Other characteristics and advantages of the invention will emerge upon reading the following description of a preferential embodiment of the invention, provided as a non-restrictive example and referring to the annexed drawings, wherein.

6. DETAILED DESCRIPTION

The invention therefore relates to timestamp watermarking method in a set of support data and a corresponding timestamp decoding method.

In the rest of the description, it is assumed that the set of support data in which the timestamps are watermarked is a video sequence comprising successive images. It is clear however that the invention applies to any type of support data set.

6.1 Timestamp Watermarking Method

Figure 1:
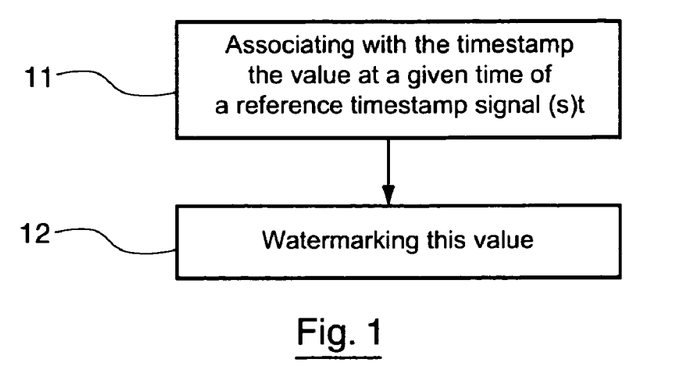
FIG. 1 shows a flowchart of a particular embodiment of the timestamp watermarking method according to the invention.

In the embodiment shown in FIG. 1, the timestamp watermarking method according to the invention comprises the following steps, for each timestamp: association (11) with the timestamp of the value at a given time of a reference timestamp signal, then watermarking (12) of this value in the support video sequence.

The reference timestamp signal is a determinist signal varying over time in a given temporal reference and being written as s(t), wherein t is incremented according to an incrementing step equal to one predetermined time unit. For example, t can be incremented every image, or every second, or every 10 images, etc. The reference timestamp signal takes separate values when t varies from $t_d$ (start time) to $t_f$ (end time).

For emission, s(t) is therefore watermarked on the video sequence 21 (support signal), before transmitting it.

Figure 2:
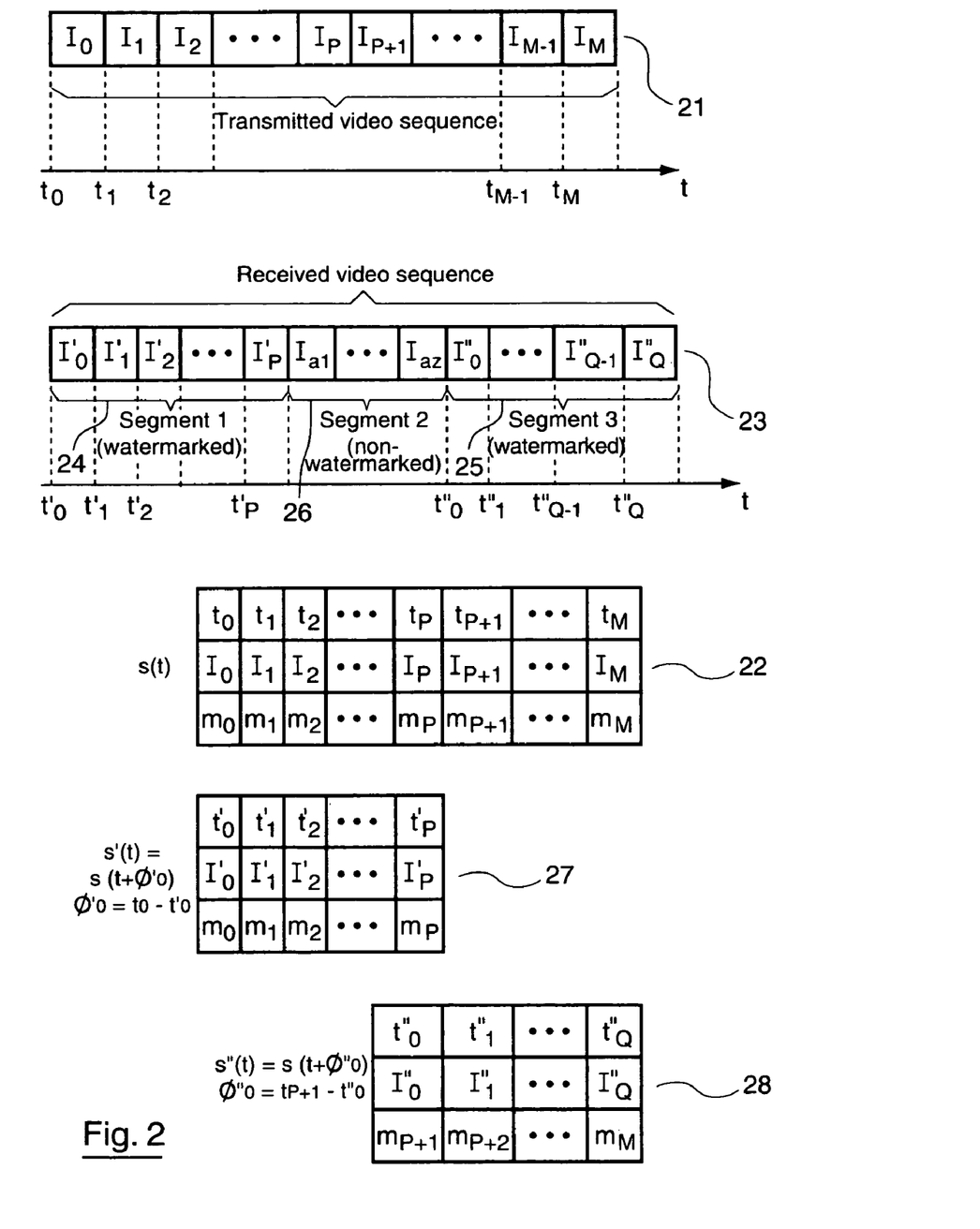
FIG. 2 illustrates, through an example, the general principle of the methods according to the invention of timestamp watermarking and timestamp decoding invention.

In the example illustrated in FIG. 2, the values $m_0, m_1 \ldots m_M$ of the reference timestamp signal s(t), at the times $t_0, t_1 \ldots t_M$ are watermarked in the separate images $I_0, I_1 \ldots I_M$ of the video sequence 21. This is summarised in the table referenced 22 in FIG. 2.

Figure 3:
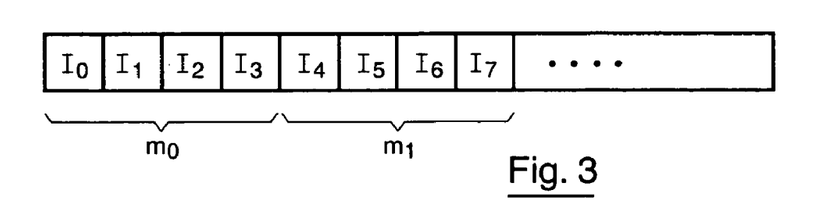
FIG. 3 illustrates a variant embodiment in which each value of the timestamp signal is spread over several images.

In the embodiment variant illustrated in FIG. 3, each value of the reference timestamp signal is watermarked while being spread over several (four) images. Hence, the bits of the value $m_0$ are spread in the images $I_0$ to $I_3$, the bits of the value $m_1$ are spread in the images $I_4$ to $I_7$, etc.

It will be noted that with the technique of the invention, the timestamp accuracy and the granularity of detection are two decorrelated parameters: diagrams can be imagined with a great precision requiring a great number of images for decoding. For example, it is possible to code only one bit of the sequence per image, and read the timestamp on a group of n successive images: the bitrate will then be very low, although the accuracy remains high. One implication of this is that concentration can be focussed either on coding the timestamp in each image, or distributing it in time. By giving emphasis to the spatial dimension, the detection latency is reduced. By giving emphasis to the time dimension, the detection latency is increased, but it is possible, for a same steganographic bandwidth reserved for the timestamp, to increase the precision and amplitude of the timestamp.

6.2 Timestamp Decoding Method

In the rest of the description, and as illustrated in FIG. 2, it is assumed for illustrative purposes that the original video sequence 21 is edited after its emission and that the received video sequence 23 comprises two watermarked segments 24, 25 (resulting from the cutting of the original video sequence 21) between which is inserted a non-watermarked segment 26. Hence, in this illustrative example:

the first received watermarked segment 24 contains images $I_0, I_1 \ldots I_P$ corresponding to the images $I_0, I_1 \ldots I_P$ of the original video sequence 21 and thus containing the values $m_0, m_1 \ldots m_P$ of the reference timestamp signal s(t). This is summarised by the table referenced 27 in FIG. 2, the received non-watermarked segment 26 contains the images $I_{a1}, I_{a2} \ldots I_{az}$, not corresponding to any image of the original video sequence 21, and the second received watermarked segment 25 contains images $I_0'', I_1'' \ldots I_Q''$ corresponding to the images $I_{P+1}, I_{P+2} \ldots I_M$ of the original video sequence 21 and thus containing the values $m_{P+1}, m_{P+2} \ldots m_M$ of the reference timestamp signal s(t), where P+Q−1=M. This is summarised by the table referenced 28 in FIG. 2.

Figure 4:
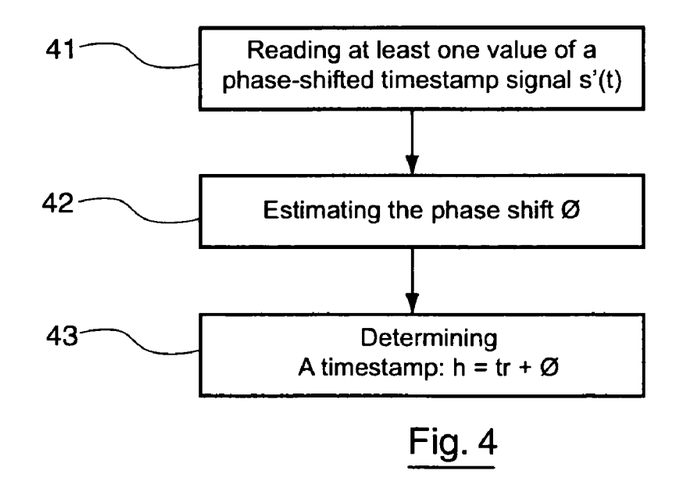
FIG. 4 shows a flowchart of a particular embodiment of the timestamp decoding method according to the invention.

In the embodiment shown in FIG. 4, the timestamp decoding method according to the invention comprises the following steps:

reading (41), in the received video sequence, of at least one value of a phase-shifted timestamp signal s'(t), of the same form as the reference timestamp signal s(t) but having in relation to this signal an unknown phase shift $\phi$ in a given temporal reference: s'(t)=s(t+$\phi$); (see above the description of the preliminary watermarking of each timestamp in this given temporal reference, consisting in a watermarking of the value, at a given watermarking time, of the reference timestamp signal), estimation (42) of the phase shift $\phi$ from said (at least one) read value of the phase-shifted timestamp signal s'(t) and from the knowledge of the reference timestamp signal s'(t), for said (at least one) read value at a given time $t_r$, determination (43) of a timestamp h associated according to the read time $t_r$ and the estimated phase shift $\phi$: h=$t_r$+$\phi$.

In short, upon reception, the reference timestamp signal s(t) is known and an out-of-phase timestamp signal s'(t) of the form s(t+$\phi$) is received, t varying from $t_d'$ (start time) to $t_f'$ (end time). The phase shift $\phi$, also called phase originally, is unknown, and an attempt is made to estimate it. When one has obtained an estimation of $\phi$ considered to be reliable, the timestamp corresponding to each image can be given: for any t between $t_d'$ and $t_f'$, the timestamp will be equal to t+$\phi$.

For the first received watermarked segment 24 of the aforementioned example illustrated in FIG. 2, the timestamp decoding is therefore performed as follows. At the times $t_0, t_1 \ldots t_P$, the values $m_0, m_1 \ldots m_P$ of a first phase-shifted timestamp signal s'(t) are read in the images $I_0', I_1' \ldots I_P'$. From at least one of these values, an estimation is made of the phase shift $\phi_0'$ between the reference timestamp signal s(t) and the first phase-shifted timestamp signal s'(t): s'(t)=s(t+$\phi_0'$). This gives: $\phi_0'$=$t_0$−$t_0'$. For any t between $t_0'$ and $t_p'$, the timestamp will be equal to t+$\phi_0'$.

For the second received watermarked segment 25 of the aforementioned example illustrated in FIG. 2, the timestamp decoding is therefore performed as follows. At the times $t_0'', t_1'' \ldots t_Q''$, the values $m_{P+1}, m_{P+2} \ldots m_M$ of a first phase-shifted timestamp signal s'(t) are read in the images $I_0'', I_1'' \ldots I_Q''$. From at least one of these values, an estimation is made of the phase shift $\phi_0''$ between the reference timestamp signal s(t) and the first phase-shifted timestamp signal s''(t): s''(t)=s(t+$\phi_0''$). This gives: $\phi_0''$=$t_0$−$t_0''$. For any t between $t_0'$ and $t_Q'$, the timestamp will be equal to t+$\phi_0''$.

In practice, the phase-shifted timestamp signal s(t+$\phi$) is frequently spoiled with noise. One thus only has available a signal s'(t+$\phi$)=s(t+$\phi$)+e(t), e(t) being a noise signal.

In some cases, the signal can also experience a change of sampling frequency. For example, if the support video sequence (original video sequence) is converted from the European TV format (25 images per second) to the American TV format (30 images per second), and if it is chosen to increase t every image (in the resulting video), the timestamp signal on the resulting video will then be of the form $\square s(\omega \cdot t + \phi)$, where $\omega=25/30$. In other words, in this case, the determination of the timestamp h moreover takes into account a change in sampling frequency between the reference timestamp signal s(t) and the phase-shifted timestamp signal s'(t), in such a manner that the timestamp h is such that: $h=\omega \cdot t+\phi$, where $\omega$ is equal to the ratio between the sampling frequency of the reference timestamp signal and the sampling frequency of the phase-shifted timestamp signal.

A description will now be given of diverse manners of implementing the reading step (referenced 41 in FIG. 4) of at least one value of the phase-shifted timestamp signal s'(t), in the received video sequence.

In a first implementation (not shown), the reading step 41 comprises the following steps: reception of the raw data of at least one received value (reception of bits, without processing these bits), then separate decoding of each received value, enabling a read value of the out-of-phase signal equal to one of the values of the reference signal to be obtained. The decoding is necessary because owing to the fact that the received signal is noisy, the received value does not correspond to any of the possible values of the reference signal, and it is necessary to find (and finally take as read value) the closest possible value of the received value.

Figure 7:
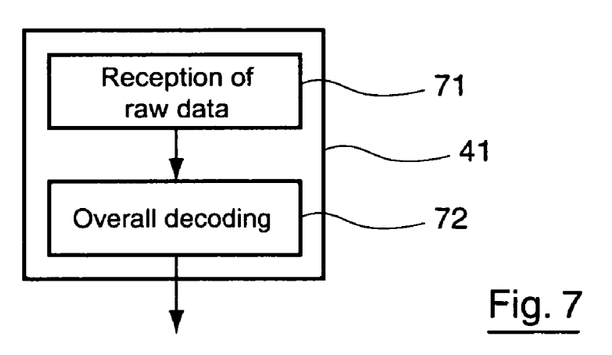

In a second implementation shown in FIG. 7, the reading step 41 comprises the following steps: reception of the raw data (71) of a sequence of received values, then overall decoding (72) of this sequence of received values to obtain read value of the out-of-phase signal equal to one of the values of the reference signal. This overall decoding consists for example in a decoding by sliding correlation decoding between the sequence of received values and the sequence of values of the reference signal. The received value maximising the intercorrelation is retained as read value and is used to estimate the phase shift (which itself enables the timestamps of a same watermarked segment to be determined).

Figure 6:
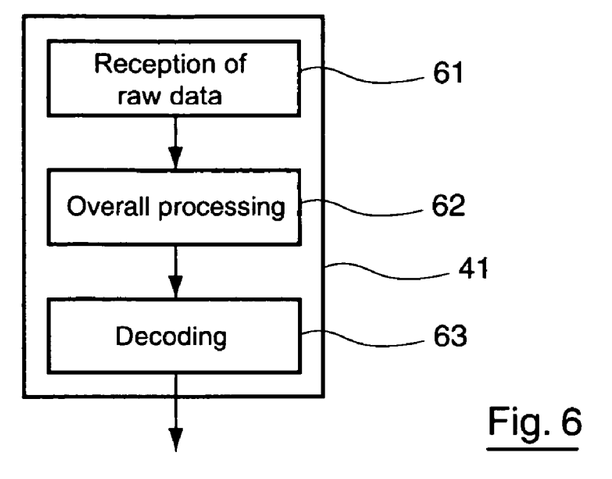

In a third implementation shown in FIG. 6, the reading step 41 comprises the following steps: reception of the raw data (61) of a sequence of received values, then overall processing (62) of the sequence of received values to obtain a resultant value, and finally a decoding (63) of this resultant value to obtain a read value of the out-of-phase signal equal to one of the values of the reference signal.

A description is given below of several examples of this third implementation of the reading step 41.

In a first example of the third implementation of the reading step 41, the sequence received comprises T received values $y_1, \ldots, y_k, y_{k+1}, y_T$, corresponding to T initial noisy values $x_1, \ldots, x_k, x_{k+1}, \ldots x_T$, the initial values $x_1, \ldots, x_k, x_{k+1}, \ldots x_T$ being such that there is:
 a predetermined function f enabling a $k+1^{th}$ initial value to be calculated according to the $k^{th}$ initial value: $\forall k \, x_{k+1}=f(x_k)$, and
 a predetermined function $f^{-1}$ enabling a $k^{th}$ initial value to be calculated according to the function of the $k+1^{th}$ initial value: $\forall k \, x_k=f^{-1}(x_{k+1})$.

The initial values $x_1, \ldots, x_k, x_{k+1}, \ldots x_T$ are for example separate words of an m-sequence code, and in this case the functions f and $f^{-1}$ are cyclic permutations (see detailed description below of the decoding of the RTM rapid part of the value associated with a timestamp).

During the overall processing phase (62), T' estimations of an initial value $x_j$, where $T' \leq T$ and et $i \in \{1 \ldots T\}$, by applying the function f or the function $f^{-1}$ a predetermined number of times to each one of T' received values. The decoding step then consists in performing a majority decoding operation based on the T' estimations of the initial value $x_j$.

A second example (of the third implementation of the reading step 41) is distinguished from the first example above in that, during the overall processing step (62), a merger of the T estimations of the initial value $x_j$ is also performed, enabling a merged value to be obtained, and in that the decoding step (63) consists in performing a decoding of the merged value. The decoding of the merged value is for example an exhaustive decoding. The fusion step consists for example in performing an average of the T estimations of the initial value $x_j$.

In a third example of the third implementation of the reading step 41, the received sequence comprises T received values $y_1, \ldots, y_k, y_{k+1}, \ldots y_T$, corresponding to T noisy initial values $x_1, \ldots, x_k, x_{k+1}, \ldots x_T$, that are for example separate words of any code (standard correcting code—BCH, Reed-Solomon, convolutional code, etc.) or else an m-sequence code as previously described. During the overall processing step (62), T' received values are merged, with $T' \leq T$, in such a manner as to obtain a merged value (equal for example to the average of the T' received values). The decoding step (63) then consists in performing a decoding of the merged value, for example an exhaustive decoding.

It will be noted that in the third implementation of the reading step 41, the timestamp coding can be seen as a scaling coding over time. Indeed, if the signal is very noisy, the information of several consecutive images can be processed overall before proceeding with the decoding (it is reduced to a resultant value and only this resultant value is decoded). There is therefore a correcting code equivalent to a higher redundancy, therefore more resistant to noise. However, the detection latency will be higher. The resolution (minimum size of watermarked sequence necessary to decode a segment) thus varies automatically according to the signal to noise ratio, without needing to modify the coding.

6.3 Example of Coding Each Value into Slow Part (STM) and a Rapid Part (RTM)

It is assumed in the rest of the description that there is a change of timestamp for every image. It is easily possible to deduce from this particular case the operation of the invention in other cases where the timestamp changes every n images.

Figure 5:
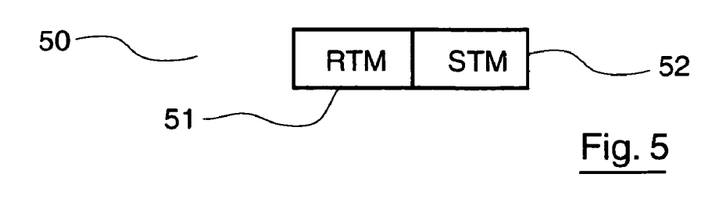
FIG. 5 illustrates a two-part structure, slow and rapid respectively, for the values of the timestamp signal, FIGS. 6 and 7 each show a separate embodiment of the read step appearing in FIG. 5, FIG. 8, a flowchart of a particular embodiment of a method according to the invention enabling the decoding of timestamps and the estimation of the boundaries of a watermarked segment.

In the particular embodiment illustrated in FIG. 5, each value 50 of the reference timestamp signal s(t) comprises two parts:
 a slow part (or STM, "Slow Temporal Marker") 52, that changes for example every 1023 images, and
 a rapid part (or RTM, "Rapid Temporal Marker") 51, that changes for every image with a period P (in the example given: P=1023).

It is seen that the slow part/rapid part separation is in this case analogous to a base 1023 representation.

The association and watermarking steps (referenced 11 and 12 in FIG. 1) are performed separately, and whether identical or not, for each of the parts.

This separation has the advantage of reducing the decoding complexity.

On the RTM part, an overall processing of the shift and merger type is performed (see the second example of the third implementation of the reading step 41) followed by an exhaustive decoding, since the number of possible code words is relatively low (1023).

Whereas in the STM slow part, for example, an overall processing of the shift type (without merger) is performed on n successive images (see above the first example of the third implementation of the reading step 41) prior to a majority decoding operation, since a change of slow part among the shifted images is fairly low (n/1023).

In general, a decomposition into N parts can be obtained. The part of row 1, called rapid part, is incremented every timestamp and takes cyclic values according to a period $p_1$. Every part of row rang i, with $i \in \{2 \ldots N\}$, is incremented when the part of row i−1 has covered a full period $p_{i-1}$, and takes cyclic values according to a period $p_i$.

6.3.1 Coding of the Rapid Part of the Timestamp (RTM)

As already mentioned above, in order to make the decoding of timestamps more rapid, a sequence of received values $y_1$, $y_k, \ldots$ is generated corresponding to a sequence of noisy initial values $x_1, \ldots, x_k, \ldots$, the initial values $x_1, \ldots, x_k, \ldots$ being such that a k+1$^{th}$ initial value can be calculated according to the k$^{th}$ initial value: $\forall k \; x_{k+1} = f(x_k)$ Generally, $x_i$ can either be a scalar (a number), or a vector (a series of numbers).

Hence, when a series of elements $y_k, y_{k+1}, \ldots y_{k+i}$ is received (received values) corresponding to the sequence of noisy elements $x_k, x_{k+1}, L, x_{k+i}$ (initial values), it is possible to reduce to several estimations of a same initial value $x_{k+i}$ by applying the function f a certain number of times to each of the received elements.

This property is interesting when the function $f$ is linear, and that the data is noisy: if one observes the noisy sequence $y_k, y_{k+1}, L, y_{k+i}$ with $y_j = x_j + e_j$, $e_j$ being the noise, then a series of estimations will be obtained for the element $x_j$ given by:

$$\hat{y}^0_{k+i} = y'_{k+i}$$
$$= x_{k+i} + e_{k+i}$$
$$\hat{y}^1_{k+i} = f(y'_{k+i-1})$$
$$= f(x_{k+i-1}) + f(e_{k+i-1})$$
$$\hat{y}^2_{k+i} = f \circ f(y'_{k+i-2})$$
$$= f \circ f(x_{k+i-2}) + f \circ f(e_{k+i-2})$$
$$= L$$
$$\hat{y}^i_{k+i} = \underbrace{f_1 \circ_4 f_2 \circ L_4 \circ_3 f}_{i \text{ fois}}(y'_k)$$
$$= \underbrace{f_1 \circ_4 f_2 \circ L_4 \circ_3 f}_{i \text{ fois}}(x_k) + \underbrace{f_1 \circ_4 f_2 \circ L_4 \circ_3 f}_{i \text{ fois}}(e_k)$$

If the function $f$ does not increase the weight of the error vector (for example if $f$ is a permutation), then it is possible to consider only the elements $\hat{y}_j$ for the decoding without losing any information. For example, it is possible to carry out a majority decoding: the performances will be equivalent to those that would have been obtained with a repetition of i+1. Moreover, if the calculation of the function $f$ is not too costly, the decoding complexity will be much lower than with a decoding by correlation as described above.

In a more general manner, if the noise level varies according to the reception times (for example, if the probability of error varies over time), and if in addition it is possible to estimate this noise level (by the techniques notably described in 6.5.2), the elements (received values) can then be selected corresponding to the lowest noise level and the merge operation performed only on these elements.

A definition of the function $f^{-1}$ will now be given as the inverse function of f, such that:

For any element x $f \cdot f^{-1}(x) = f^{-1} \cdot f(x) = x$

It is thus possible to obtain an estimation of any element $x_j$ (initial value) from any noisy element $y_k$ by applying (j−k) times f to $y_k$ if k<j, and (j−k) times $f^{-1}$ to $y_k$ if k>j.

An interesting family of codes taking into account the properties searched for described above is the family of the m-sequence codes. These codes are well known by a person skilled in the art; they are for example described in "Digital Communications", John Proakis, 3rd edition, McGraw-Hill International Editions, p 433-435, under the name "Maximum Length shift-register codes". It should also be noted that, in relation to the codes described in this work, the word constituted only by zeros is not included in the set of code words.

Take for example the m-sequence code (1023, 1023, 512). This code is obtained in the following manner: the m-sequence is considered for m=10, generated by the shift registers of connections (1,8) (see FIG. 9). The shift registers 91 to 910 are initialised with all the register values at 0, except for the first register (referenced 91) at 1. At each clock cycle, the values in the registers are shifted by 1 (the value of the register k goes to the register k+1); the value of the last register (referenced 910) constitutes the output value; and the first register 91 is fed with the sum (modulo 2) of the first and eighth registers (referenced 91 and 98 respectively) and 8 (values taken before the shift).

Figure 9:
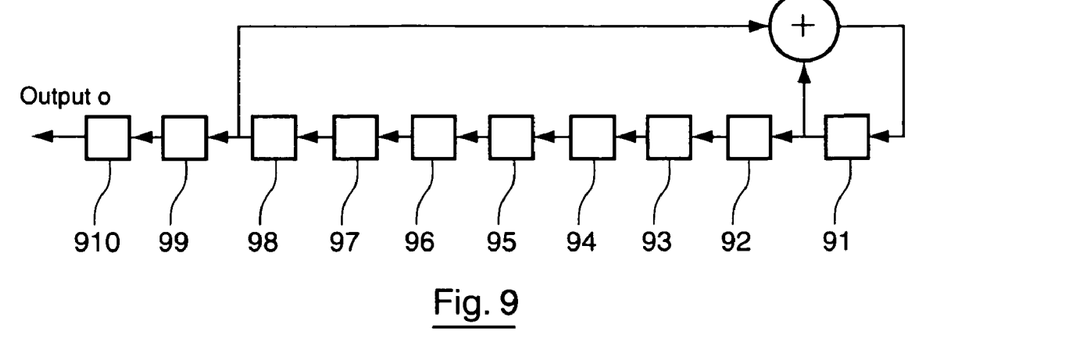
FIG. 9 shows a particular embodiment of a code-sequence (1023, 1023, 512) being able to be used in a particular embodiment of the timestamp watermarking method according to the invention.

It can be shown that all the output values $s_k$ form a periodic sequence of length $L=2^m-1$ (here m=10, hence L=1023). A code formed by all the words $\{c_i\}$ of length L generated in the following manner is considered:

$$c_i(j) = s_{i+j \bmod [L]}$$

Namely that the code is constituted by all the cyclic permutations of the output sequence. It can be shown that the minimum distance between any two words of the code is $2^{m-1}$ (512 in this case).

The rapid part RTM of an ith value of the reference timestamp signal is coded by the ith permutated sequence (ith word of the code): $c_i$. The code thus comprises a set of 1023 words (thus allows messages of a length slightly less than 10 bits to be coded) coded on a length of 1023 (thus redundancy slightly greater than 102). This highly redundant code thus enables a good resistance to noise to be obtained. The cyclic structure of the m-sequence code also allows the prior merger of the decoding to be made easier: indeed, it is known that the noisy words of successive images $r'_i, r'_{i+1}, \ldots r'_{i+k}$ correspond to the successive cyclic shifts of a same unknown word, $c_j$. It is therefore possible, by a series of cyclic shifts, to reduce to a same code word:

$$\hat{c}_i^0 = r'_i$$
$$\hat{c}_i^1 = r'^{(-1)}_{i+1}$$
$$\ldots$$
$$\hat{c}_i^k = r'^{(-k)}_{i+k}$$

with the notation $x^{(i)}$ denoting the cyclic permutation of i positions to the right of the word x.

It should be noted here that the cyclic permutation of a position to the right corresponds to the function $f^{-1}$ described in the general case of paragraph 6.3.1 above. The function f corresponds to the cyclic shift of a position to the left.

The words $r'_j$ obtained correspond to different noisy versions of a same word. They can then be averaged to reduce the effect of the noise and improve the decoding. The merger of n words is therefore equivalent to a repetition of n times the word.

One of the possible manners of realising the decoding consists in performing the correlation with all the words of the code (exhaustive decoding). The most probable word is considered to be the word that has the best correlation score with the received word. An evaluation is carried out of the error probability that is made by selecting this word, by comparing the correlation score with a predetermined threshold. This threshold depends on the error probability considered as acceptable for the system.

6.3.2 Coding of the Slow Part (STM)

Any type of code can be used to transmit the slow part STM of each value of the reference timestamp signal (there is no constraint on the complexity of calculating a successor as for the rapid part), for example a standard correcting code (BCH, Reed-Solomon, convolutional code, etc.) or else an m-sequence code as described above.

6.4 Concept of Segment

Is has been seen above that with the technique of the invention, when an attempt is made to decode the timestamps throughout a received video sequence, an attempt is actually made to find one single item of information, the phase shift between the phase-shifted timestamp signal and the reference timestamp signal. In fact, in most applications it is necessary to determine two extra unknowns, namely the start and end of a segment watermarked with successive timestamps, namely a video sequence segment comprising values all presenting a same phase shift (time shift) in relation to the identical values of the reference timestamp signal.

Typically, in the applications where a succession of relatively short segments are involved (pieces of video sequences), fed back in alternation with non-watermarked segments (case of news statistics), it is necessary to be able to identify the start and end of the watermarked segments fairly precisely. During a "gluing" of two segments taken at different times, there will be a phase shift discontinuity at the transition between the two segments, that must be identified and located as precisely as possible (see above the description of FIG. 2).

The decoding according to the invention can be made more effective by using the segment watermarking model. The morphological properties of the segments can be used to limit the number of false alarms and error and increase the detection rate by injecting prior data on the minimum size of the segments and holes. It can therefore be assumed that a watermarked segment received (with the same phase shift) has a minimum length Lmin in the order of a second: one can thus delete the segment of lower size, that correspond very probably to false alarms or errors. Likewise, when a detection "hole" is observed between two segments watermarked with the same phase shift, it is very likely that this is a continuously watermarked segment. If this hole is of a reasonable size (in the order of a few seconds), one can therefore "fill" it.

The segment aspect can also be used during the decoding itself, by using the intrinsic scalability conferred on the coding. By being based on the fact that the size of the watermarked segment is greater than a minimum size Lmin (see above), it is known that at least Lmin images can be merged (with or without prior shifting, according to the part of the received values that is processed) before attempting a "standard" decoding operation. The difficulty lies in the fact that the position of the segment boundaries is not known, and therefore that there is no prior knowledge of which images can be merged together: the decoding must therefore be carried out (estimation of the watermarking value) jointly with the estimation of the segment boundaries.

In practice, a genuine joint estimation is difficult and complex to perform. Preference is given to a forward-backward process, where the value is estimated then the boundaries (or the boundaries, then the value), even if this means refining and reiterating the process if the results obtained are not conclusive.

For example, if the watermarking on a portion of video was successful (so the portion is included in the segment actually watermarked), then a continuation mechanism is used to determine the segment boundaries (continuation before and after).

Conversely, one can first estimate whether a portion of video belongs to a same watermarked segment (determination of the boundaries before performing the decoding, by using a statistical measurement of data consistency. This measurement can be intrinsic (based on the timestamp data only) or extrinsic (for example, use of an error rate estimation performed during the decoding of another part of the watermarking).

It should be noted that these decoding principles are general and are not only applicable to the particular case of the herein presented method of decoding the timestamp by transmission of a timestamp signal, and search for the phase shift of the decoding. The morphological properties of the segments can be used with any transmission mechanism of the date and time, for example with the method described in the state of the art. One can, for example seek to decode the date and time individually on each image or each image group of the sequence, then use the prior information of the sizes of the holes and segments so as to consolidate the decoding obtained. Likewise, you can also use on these methods continuation methods, by performing, from the date and time previously decoded on a portion of the video, a prediction of the date and time on a related part of this portion, and by seeking to verify or refute this prediction on the related part. The said continuation mechanism will thus enable the boundaries of the watermarked segment to be determined with more precision.

6.5 Decoding of the Rapid Part (MTR) and Estimation of the Segment Boundaries A description has been given above of a simple decoding principle of the rapid part RTM by merging, that is suitable when the timestamp is continuous (no change), and when the characteristics of the transmission channel are almost constant (particularly no time variation of the error rate). A more complete and more robust description will now be given, suited to practical cases wherein the segment boundaries are not known in advance and wherein the decoding of the value of the RTM rapid part must be estimated jointly.

Figure 8:
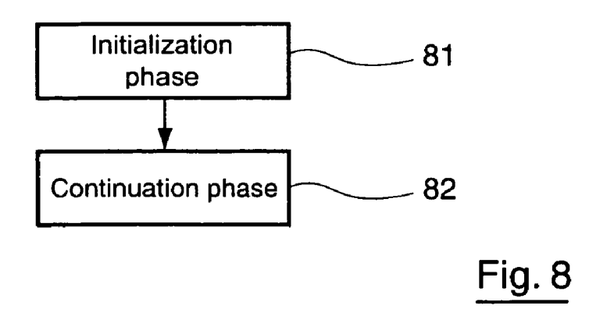

As shown in FIG. 8, the algorithm can be broken down into two phases:
- an initialization phase 81, where no prior information is available on the value of the watermarking or on the location of the segments. An attempt is therefore made to decode a timestamp without any a priori on the location or value of this timestamp,
- a continuation phase 82, where the value of the timestamp on a portion of the sequence is known, and a test is made on the presence or absence or a consistent timestamp (namely identical phase shift) on images close to the decoded portion. This phase enables the segment boundaries with the same phase shift to be decoded.

As explained below, in each of the phases, the algorithm has been designed in such a manner as to adapt to the variations in error rate of the channel, as well as a phenomenon of jitter due to the MPEG coding.

6.5.1 Modelling of the Transmission Channel

This modelling enables the bases of the algorithms proposes to be understood, together with the reasons for their effectiveness.

After an MPEG compression, the watermarking signal is spoiled by two types of noise:

tonal noise: chiefly due to the quantization of DCT coefficients. The watermarking signal is affected by a noise that can be considered as independent from the signal itself, timestamp jitter caused by the MPEG drive. Motion prediction (P or B image coding by prediction from I or P images) means that the watermarking carried by a reference images (I or P) can be "recopied" onto a predicted images (P or B). In such an image, the received signal will therefore be a "mixture", in variable proportions, of the "true" watermarking signal of the current image and watermarkings of the images used to carry out the motion prediction. It is not uncommon that the level of watermarking of the reference images is, in the predicted images, higher than the "true" watermarking (which can be completely washed out).

A noisy watermarking signal of the form is therefore obtained:

$$y(t) = b(t) + \sum_{i=-\tau_2}^{i=\tau_1} \alpha_t(t+i)x(t+i)$$

b(t) is the tonal noise at time t, of variable energy over time
y(t) is the watermarking signal received at time t
x(i) is the watermarking signal transmitted at time i.
$\alpha_t(t+i)$ is a weighting coefficient of the watermarking signal t+i. It varies over time since the type of MPEG prediction varies. If the image t is Intra coded, then only $\alpha_t(t)$ will be non null. However, if the image t is coded Bidirectional, then it is probable that there will be a certain number of non null $\alpha_t(t+i)$ coefficients.

$\tau_1$ and $\tau_2$ are the prediction limits. They are distant by a length of GOP (Group Of Pictures in MPEG terminology) or less.

6.5.2 Initialization Phase

In the initialization phase (81), there is no prior information on the value of the watermarking, or on its position (it is not even known whether the video portion is watermarked: this is a detection phase).

Two properties are used to make detection easier:
it is theoretically known that, if an image is watermarked, the neighbouring images will also be watermarked (minimum size of segment),
a measurement of quality, intrinsic or extrinsic, of each of the images is used to lower the decoding complexity.

The first property enables the detection rate to be increased by merging several images before performing the decoding. A "full" start algorithm is the following:
a sequence of size N is considered
for all the segments of size greater than Lmin, included in the sequence (there is in the order of $N^2/2-L_{min}N$ such sequences), a decoding after merging is attempted,
if the decoding terminates on at least one of the segments, it is considered that the start phase was successful. The start phase of the segment with the best decoding score is kept as a hypothesis.

The disadvantage of this algorithm is a great complexity, all the more so as N is large (in practice N can increase very rapidly when the start phase is remained in for a long time, namely when the video is not watermarked).

In one embodiment variation enabling the complexity to be reduced, the number or samples (received values) merged is limited, as well as the temporal window used (smallest video segment containing all the samples merged, these samples not necessarily being consecutive). In order to select the samples for which the decoding is more likely to succeed, the "quality" of each sample is evaluated beforehand either by an extrinsic measurement of quality or an intrinsic measurement of quality.

Extrinsic measurement of quality: when an identifier is watermarked at the same time as the timestamp, and when the decoding of this identifier is performed beforehand, the results of the identifier decoding can be use to measure the signal to noise ratio. If the identifier consists of a fixed pattern, the correlation score can be used. If the identifier is coded over n bits, and an exhaustive decoding is impossible, two cases are possible: either the decoding fails (and in this case, the decoding of the timestamp is not attempted, or else the minimum quality score is assigned to the image, or the decoding is successful and the score assigned is the score of correlation with the decoded word).

Extrinsic measurement of quality: the timestamp data itself (data of the received value) is the basis here to estimate the quality of the transmission. This is notably possible when it is possible to perform, with a low complexity, an exhaustive decoding. The most probable word is then obtained, as well as the associated quality (correlation score for example). This score can be used to select the best images prior to the merging. However, other measurements of the quality are possible even when the decoding is not exhaustive (for example, distance to the decoded word if the decoding is successful, in the case of an incomplete decoding).

Once a set of samples of the best quality is determined, the merger as described in 6.3.1 can be performed.

6.5.3 Continuation Phase

In the continuation phase 82, the RTM rapid part values having a same phase shift m have already been decoded on an interval $[t_1;t_2]$. An attempt is made to "extend" the interval, namely to test for the presence in t1−1 and t2+1 of values having the same phase shift m. In relation to the decoding of the start phase, this is therefore a step of lower complexity, as only two hypotheses are tested ("m present" or "m absent").

The continuation can handle variations in the error rate of the channel (typically a lower signal to noise ratio on predicted images in relation to Intra images) in different manners: hysteresis mechanism (correlation threshold in the continuation phase lower than in the start phase); time mechanism (at the same time as a correlation threshold, a threshold number of undetected consecutive images is set), etc.

Such an algorithm for the time mechanism can be described in the following manner:

parameters:

T_MAX: number of undetected consecutive images tolerated

Threshold: correlation threshold for the detection algorithm:

Initialisation of the continuation phase (it is begun after the start phase)
nb__ndet = 0 (number of undetected images)
m: phase shift of the test RTM
t = t2+1 (first non-decoded image)
continuous rate:
   as long as nb__ndet <= T__MAX
      correlation between the data of the image t and m
      if correlation score greater than Threshold //detection ok
         nb__ndet=0

```
    else
       nb_ndet ++
       if nb_ndet >T_MAX // the signal has been lost
          go to start phase
    t++
```

6.5.4 Taking the Phase Jitter Due to the MPEG Coding into Account

It has been seen in the channel model that the MPEG compression leads to a timestamp jitter that can also be called "phase shift jitter" in the context of the present invention. Indeed, the instantaneous value of the phase shift (between the phase-shifted timestamp signal and the reference time signal) fluctuates around an average value, according to the type of motion compression of each image.

In the continuation phase, the detection of the RTM rapid part can be improved by taking into account the possible fluctuations of the phase shift around its mean value. To do this, a definition must firstly be made of what is the mean of a set of phase shifts, which is not trivial as the phase shifts are at value in finite group (all the integers modulo 1023 in the aforementioned example). For example, if it is considered that the values 0 and 1022, which are "close" in the group of the integers modulo 1023, 511 is clearly not a relevant mean. The calculation of the mean cannot therefore be reduced to a modulo 1023 sum, followed by a division and rounding operation.

Figure 10:
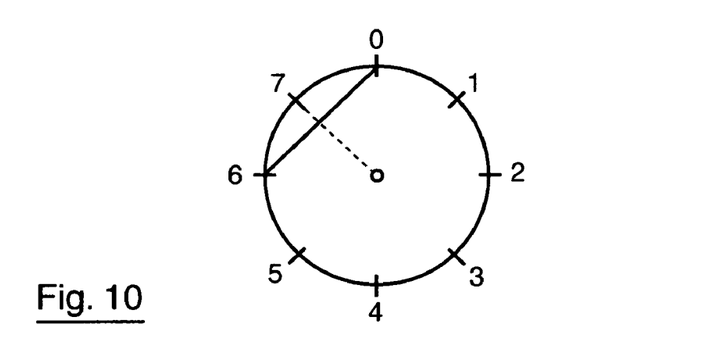
FIG. 10 is a representation of the integers modulo 8 as points on a circle, also showing the calculation of the mean of 0 and 6, which results in 7.

A more suitable representation consists in interpreting an integer modulo n as a phase (an angle) of a point on a circle (all the points allowed being discrete and regularly distributed on the circle). An integer k modulo n can therefore be represented in its complex form: $e^{2\pi i k/n}$, i being the complex root of $-1$.

The mean m of several values $\{k_j; \ldots k_1\}$ modulo n can be represented as the phase of the mean (complex) M of the corresponding points:

$$M = \sum_{j=1}^{l} e^{\frac{2\pi i k j}{n}}$$

$$M = \rho e^{2\pi i \phi}$$

$$m = E(n\phi)$$

$$\phi \in [0, 1[$$

$E(.)$ being the rounded function

For example, FIG. 10 is a representation of the integers modulo 8 as points on a circle. This figure also shows the calculation of the mean of 0 and 6, which terminates in 7.

The continuation algorithm taking into account the phase shift jitter can therefore be summarised in three steps:
- calculation of the most probable phase shift $\phi_t$ for the image t,
- calculation of the distance between $\phi_t$ and the mean phase shift $\phi_m$ to determine whether or not there is a break in consistency,
- update of the mean phase shift $\phi_m$ taking account of the new estimated phase shift $\phi_t$.

The first step can consist, for example in a test of 2T+1 hypotheses, T being the maximum amplitude of the jitter (typically, T is the MPEG GOP size). The hypotheses to test are then all the phases $[\phi_m-T; \phi_m+T]$. The hypothesis chosen will be the most probable phase shift $\phi_t$ (maximising the correlation for example).

The distance between phase shifts must also be calculated with precaution, by taking into account the "cyclic nature of the data processed. The relevant function is:

$$d_{mod(n)}(k_1;k_2) = \mathrm{MIN}((k_1-k_2)_{mod(n)};(k_2-k_1)_{mod(n)})$$

It corresponds to the length of the smallest path on the circle to pass from one point to another (route in the clockwise direction or in the opposite direction).

Figure 11:
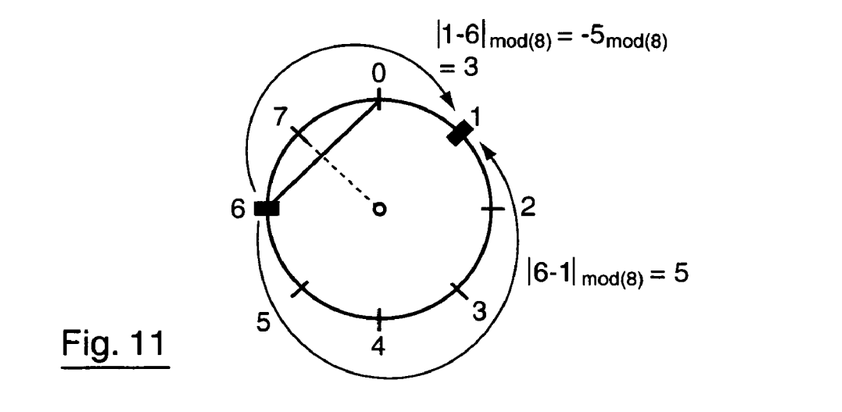
FIG. 11 illustrates a calculation of distance between two phase shifts, used in an embodiment of the timestamp decoding method according to the invention.

FIG. 11 illustrates a calculation of distance between two phase shifts for the values 1 and 6, in the same representation of integers modulo 8 as the one for FIG. 10. The result is: $d_{mod(8)}(1;6) = \mathrm{MIN}(3;5) = 3$

6.6 Applications of the Invention

The watermarked timestamps can be used jointly with a database (programme schedule), in order to identify a video extract. The database contains a list [start date, end date, title and characteristics of the programme]. During the reception of a video extract and the decoding of the corresponding timestamps, the programme can thus be identified.

The watermarking of timestamps can also be used for network control purposes. For example, a propagation time along a TV channel can be identified.

The timestamps can also be used to identify the codings along the channel (for an MPEG coding: GOP length and structure).

Timestamps can be used to mark and locate compositing in a sequence, by identifying the discontinuities of the received timestamp signal. This is notably interesting to detect advertising breaks during the recovery of a programme.

The timestamps can also be used to check that an advert has indeed been transmitted entirely and has not been cut.

It should be noted that the applications described above can be realized irrespective of the method used to transmit the timestamps, and not only with the method according to the invention of timestamp coding by watermarking the values of a known timestamp signal (clock signal) for which the reception phase shift is searched.

The invention claimed is:

1. A method of watermarking, by a processor, at least one timestamp in a set of support data, comprising, for each timestamp:
   - associating with said timestamp the value at a given time of a reference timestamp signal, that is a determinist signal varying over time in a given temporal reference and being written as s(t), wherein t is incremented according to an incrementing step equal to one predetermined time unit,
   - watermarking said value in the set of support data.

2. The method according to claim 1, wherein the reference timestamp signal has distinct values when t varies from $t_d$ to $t_f$, where $t_d$ and $t_f$ are the start and end times of the timestamp watermarking.

3. The method according to claim 1, wherein the set of support data is a sequence of successive data units, and wherein each value of the reference timestamp signal is watermarked in a separate data unit.

4. The method according to claim 1, wherein the set of support data is a sequence of successive data units, and wherein each value of the reference timestamp signal is watermarked by being spread over at least two successive data units.

5. A method of decoding at least one watermarked timestamp in a set of support data, comprising:
   - reading, in the set of support data, at least one value of a phase-shifted timestamp signal of the same form as a reference timestamp signal but having in relation to this signal an unknown phase shift $\phi$ in a given temporal reference, the previous watermarking of each timestamp consisting in a watermarking of the value at a given watermarking time of the reference timestamp signal, that is a determinist signal varying over time in a given temporal reference and being written as s(t), wherein t is incremented according to an incrementing step equal to one predetermined time unit, estimating the phase shift $\phi$ from said at least one read value of the phase-shifted timestamp signal and from the knowledge of the reference timestamp signal, for said at least one read value, read at a given time $t_r$, determining a timestamp h associated according to said read time $t_r$ and the estimated phase shift $\phi$.

6. The method according to claim 5, wherein the determination of the associated timestamp h consists in adding said read time $t_r$ and the estimated phase shift $\phi$: $h=t_r+\phi$.

7. The method according to claim 5, wherein the determination of the associated timestamp h takes into account a change of sampling frequency between the reference timestamp signal and the phase-shifted timestamp signal, in such a manner that said associated timestamp h is such that: $h=\omega \cdot t_r + \phi$, where $\Omega$ is equal to the ratio between the sampling frequency of the reference timestamp signal and the sampling frequency of the phase-shifted timestamp signal.

8. The method according to claim 5, wherein the phase-shifted timestamp signal has distinct values when t varies from $t_d'$ to $t_f'$, where $t_d'$ and $t_f'$ are the start and end times of the timestamp decoding.

9. The method according to claim 5, wherein the set of support data is a sequence of successive data units, and wherein, during the reading, each value, coded or not coded, is read in a separate data unit.

10. The method according to claim 5, wherein the set of support data is a sequence of successive data units, and in that wherein during the reading, each value, coded or not coded, is obtained by combining information read in at least two data units.

11. The method according to claim 5, wherein the reading comprises the following:

reception of the raw data of at least one received value, decoding of said at least one received value, enabling a read value of the out-of-phase signal equal to one of the values of the reference signal to be obtained.

12. A watermarking device of at least one timestamp in a set of support data, comprising:

an association processing module for enabling each timestamp to be associated with the value at a given time of a reference timestamp signal, that is a determinist signal varying over time in a given temporal reference and being written as s(t), wherein t is incremented according to an incrementing step equal to one predetermined unit of time, a watermarking processing module for watermarking said value in the set of support data.

13. A decoding device of at least one watermarked timestamp in a set of support data, comprising:

a reading processing module, being able to be used to read, in the set of support data, at least one value of a phase-shifted timestamp signal, of the same form as a reference timestamp signal but having in relation to this signal an unknown phase shift $\phi$ in a given temporal reference, the previous watermarking of each timestamp consisting in a watermarking of the value at a given watermarking time of the reference timestamp signal, that is a determinist signal varying over time in a given temporal reference and being written as s(t), wherein t is incremented according to an incrementing step equal to one predetermined time unit, an estimation processing module for estimating the phase shift $\phi$ from said at least one value of the phase-shifted timestamp signal and from the knowledge of the reference timestamp signal, a determination processing module, for said at least one read value, read at a given time $t_r$, determining a timestamp h associated according to said read time $t_r$ and the estimated phase shift $\phi$.

* * * * *